United States Patent
Chico

(10) Patent No.: US 10,240,651 B2
(45) Date of Patent: Mar. 26, 2019

(54) METHOD OF UNBLOCKING AN AIRCRAFT WHEEL BRAKE

(71) Applicant: MESSIER-BUGATTI-DOWTY, Velizy-Villacoublay (FR)

(72) Inventor: Philippe Chico, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 586 days.

(21) Appl. No.: 13/921,791

(22) Filed: Jun. 19, 2013

(65) Prior Publication Data

US 2013/0341134 A1    Dec. 26, 2013

(30) Foreign Application Priority Data

Jun. 25, 2012   (FR) ...................... 12 56019

(51) Int. Cl.
  *F16D 55/24*   (2006.01)
  *F16D 65/28*   (2006.01)
  *B64C 25/44*   (2006.01)
  *B64F 1/22*    (2006.01)

(52) U.S. Cl.
  CPC .............. *F16D 65/28* (2013.01); *B64C 25/44* (2013.01); *B64F 1/22* (2013.01)

(58) Field of Classification Search
  CPC .. F16D 2055/0058; F16D 55/40; F16D 55/36; F16D 2121/02; F16D 65/853; F16D 2127/06
  See application file for complete search history.

(56) References Cited

U.S. PATENT DOCUMENTS

| 6,296,325 | B1 | 10/2001 | Corio et al. | |
| 6,918,470 | B2* | 7/2005 | Guaraldo | 188/171 |
| 7,213,891 | B2* | 5/2007 | Sibre | 303/20 |
| 2003/0042802 | A1* | 3/2003 | Pierre et al. | 310/36 |
| 2006/0152073 | A1* | 7/2006 | Sibre | 303/20 |
| 2009/0014261 | A1* | 1/2009 | Edelson et al. | 188/156 |
| 2011/0160975 | A1* | 6/2011 | Mudry et al. | 701/70 |
| 2011/0198163 | A1* | 8/2011 | Hanlon et al. | 188/72.8 |

FOREIGN PATENT DOCUMENTS

| EP | 1 498 332 A1 | 1/2005 |
| GB | 2 450 981 A | 1/2009 |

* cited by examiner

*Primary Examiner* — Bradley T King
*Assistant Examiner* — Stephen M Bowes
(74) *Attorney, Agent, or Firm* — Sughrue Mion, PLLC

(57) ABSTRACT

The invention provides a method of unblocking an aircraft wheel brake having at least one electromechanical actuator 5 with at least one electric motor and a pusher 10 movable under drive from the motor facing friction elements 8 of the brake in order to apply a braking force selectively against the friction elements 8, the actuator 5 being provided with a blocking member 12 for blocking the pusher in position, at least after the actuator has been operated to apply a parking brake force. According to the invention, the unblocking method comprises the steps of:
  connecting an external control unit to the brake, the external control unit being adapted to act at least on the blocking member 12 of the actuator; and
  using the external control unit to cause the blocking member 12 to unblock the pusher.

6 Claims, 4 Drawing Sheets

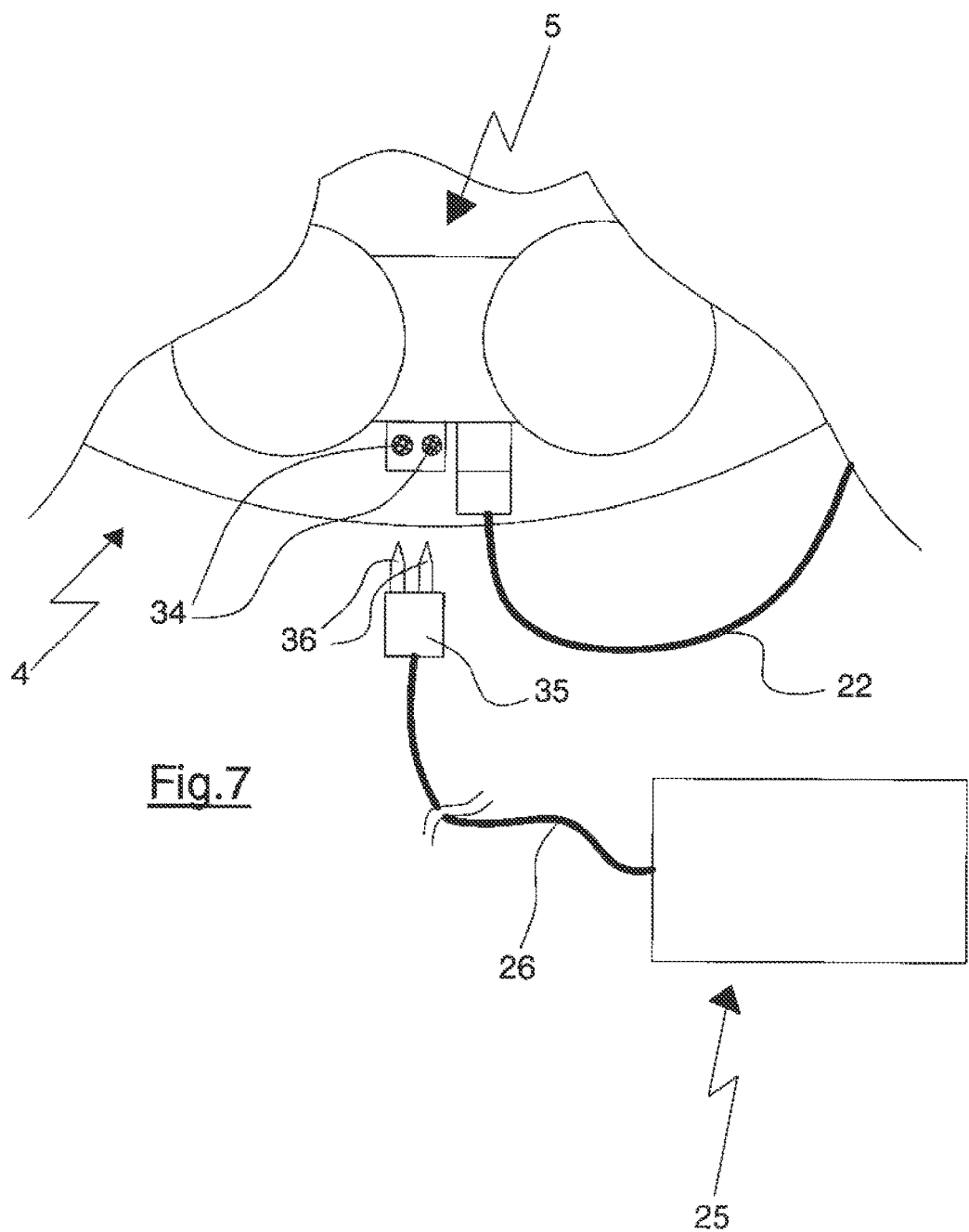

METHOD OF UNBLOCKING AN AIRCRAFT WHEEL BRAKE

The invention relates to a method of unblocking an aircraft wheel brake that is fitted with at least one electromechanical actuator having at least one electric motor and a movable pusher.

BACKGROUND OF THE INVENTION

The development of aircraft that are increasingly electric is one of the major challenges of research and innovation policies being implemented in the aviation industry. Electrical energy provides numerous advantages over mechanical, hydraulic, or pneumatic energy, including improved integration of systems and equipment, reduced maintenance costs, simplification of use, reduced weight, etc.

The development of electrical systems has led to a large increase in the numbers of pieces of electrical and electromechanical equipment that need to be powered by an electrical power supply (electricity network, batteries).

Thus, in an electric braking system, a wheel brake of an aircraft has at least one electromechanical actuator comprising a pusher actuated by an electric motor to apply a force selectively against friction elements of the brake. In order to keep the aircraft stationary while parked, the pusher of the actuator is placed in a position in which it exerts a control force against the friction elements, and then the pusher is blocked in that position so that it continues to exert a parking force on the friction elements. The actuator is generally provided for this purpose with an electrically actuatable blocking member.

It is necessary to be able to unblock the brake under all circumstances, including when the aircraft is at rest and its electrical power supply is not available.

OBJECT OF THE INVENTION

An object of the invention is to enable an aircraft wheel brake to be unblocked even when the electrical power supply of the aircraft is not available.

SUMMARY OF THE INVENTION

In order to achieve this object, the invention provides a method of unblocking an aircraft wheel brake having at least one electromechanical actuator with at least one electric motor and a pusher movable under drive from the motor facing friction elements of the brake in order to apply a braking force selectively against the friction elements, the actuator being provided with a blocking member for blocking the pusher in position, at least after the actuator has been operated to apply a parking brake force. According to the invention, the unblocking method comprises the steps of:
  connecting an external control unit to the brake, the external control unit being adapted to act at least on the blocking member of the actuator; and
  using the external control unit to cause the blocking member to unblock the pusher.

Thus, in order to unblock the brake, it is proposed to bring the external control unit into the proximity of the brake and to connect it to the brake in order to unblock the pusher. The external control unit may be provided with its own energy source (battery, etc.), however it is also possible to connect it to an energy source that is external both to the aircraft and to the unit. It is thus possible to unblock the pusher even when the electrical power supply of the aircraft is unavailable. The increase in cost is relatively small, since a single control unit suffices for unblocking all of the wheel brakes of the aircraft.

The invention also provides an aircraft wheel brake having at least one electromechanical actuator with at least one electric motor and a pusher movable under drive from the motor facing friction elements of the brake in order to apply a braking force selectively against the friction elements, the actuator being provided with a blocking member for blocking the pusher in position, at least after the actuator has been operated to apply a parking brake force. According to the invention, the brake includes additional connection means that are not used in normal operation of the brake and that are for connection to an external control unit that is adapted to control the blocking member of the actuator in order to unblock the pusher.

The additional connection means make it possible to connect the control unit directly to the brake without disconnecting an electrical cable bundle in order to release the connection means that are provided for use in normal operation.

Finally, the invention provides an external control unit for controlling an aircraft brake including at least one electromechanical actuator with at least one electric motor and a pusher movable under drive from the motor facing friction elements of the brake in order to apply a braking force selectively against the friction elements, the actuator being provided with a blocking member for blocking the pusher in position, at least after the actuator has been operated to apply a parking brake force, the unit including at least one electrical energy source, means for connection to the brake, and control means powered by the energy source and adapted to act at least on the blocking member of the brake via the brake connection means in order to unblock the pusher.

The control means of the unit thus make it possible to control the blocking member of the actuator instead of and taking the place of electrical members that are fitted to the aircraft and that are used in normal operation.

BRIEF DESCRIPTION OF THE DRAWINGS

The invention can be better understood in the light of the following description with reference to the figures of the accompanying drawings, in which:
FIG. 7 is a detailed view of an electromechanical actuator carrier of a brake of the invention.

DETAILED DESCRIPTION OF THE INVENTION

Figure 1:
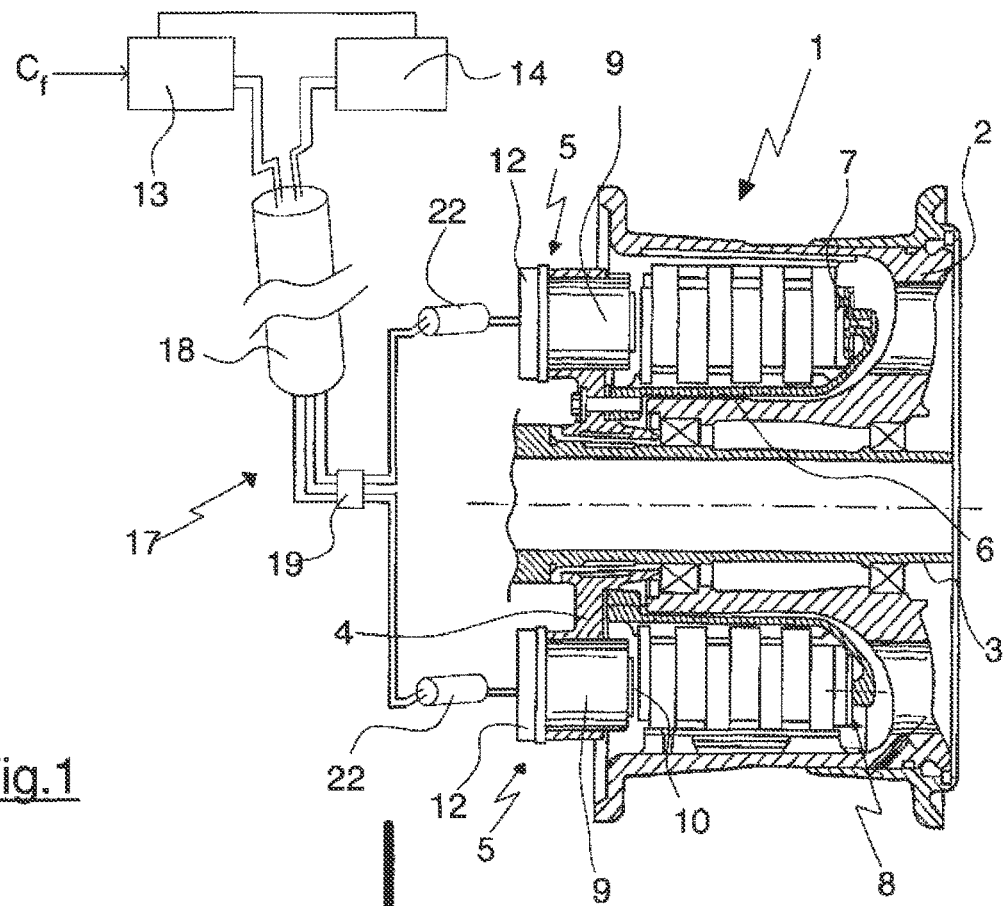
FIG. 1 is a section view of a wheel fitted with a brake having electromechanical actuators, which brake is connected by an electrical cable bundle to a control unit and a blocking unit.
Figure 2:
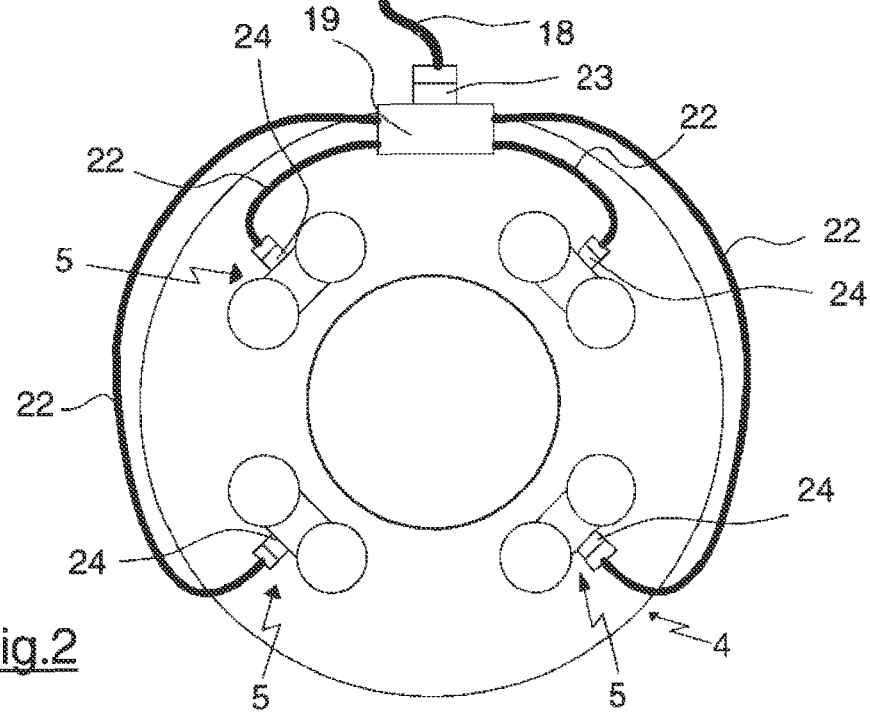
FIGS. 2 to 6 show brake actuator carriers on which various implementations of the method of the invention are installed.

With reference to FIGS. 1 and 2, a braked wheel 1 of aircraft landing gear comprises a rim 2 adapted to receive a tire (not shown) and mounted to rotate on an axle 3 carried by the landing gear. The axle has an actuator carrier 4 mounted thereon and carrying electromechanical actuators 5. A torsion tube 6 is secured to the actuator carrier 4 and extends inside the rim 2 in order to terminate with an abutment 7. The actuator carrier 4 and thus the torsion tube 6 are prevented from rotating relative to the axle 3 by stop means (not shown).

Between the abutment 7 and the actuators 5 there extend friction elements, here a stack of disks 8 made up of rotors that are constrained to rotate with the rim and of stators that are constrained in rotation with the torsion tube.

Each actuator 5 comprises a body 9 in which a pusher 10 facing the stack of disks 8 is mounted to move linearly in reversible manner under drive from an electric motor contained in the body in order to apply a controlled pressure force against the stack of disks so as to induce friction forces between the rotors and the stators of the stack of disks, thereby contributing to slowing down rotation of the rim 2 and thus to braking the aircraft.

Each of the actuators 5 also has a blocking member 12, a fail-safe brake in this example, that when powered leaves the pusher 10 of the actuator free to move under drive from the electric motor, but when no longer powered blocks the pusher 10 in position. In this example, the fail-safe brakes may be powered at low voltage (typically 28 volts).

The motor of each actuator 5 is connected to a control unit 13 of the electromechanical actuator controller (EMAC) type, and the blocking member 12 of each actuator 5 is connected to a blocking unit 14. The blocking unit 14 is itself connected to the control unit 13, which control unit 13 is arranged to perform both a controlled braking mode and a parking brake mode. In this example, the control unit 13 is situated in a protected zone inside the fuselage of the aircraft, while the blocking unit 14 is offset on the landing gear, close to the wheel 1.

In controlled braking mode, the control unit 13 receives a braking force setpoint Cf that is generated in particular on the basis of signals coming from brake pedals actuated by the pilot, and it controls the motor of each actuator 5 to move the pusher 10 of the actuator facing the stack of disks 8.

In parking brake mode, which serves to hold the aircraft stationary, the control unit 13 controls the motor of each actuator 5 so that the pusher 10 exerts a parking force against the stack of disks 8, and then it sends a blocking order to the blocking unit 14, which in turn causes the blocking members 12 to hold the pushers 10 in position. The parking force is thus maintained without assistance from the electric motor, and it is thus possible to switch off the electrical power supply, thereby reducing the electricity consumption of the brake and avoiding the electric motors becoming hot.

The motor of each actuator 5 is electrically connected to the control unit 13 via an electrical connection conveying power signals to the motor, and the blocking member 12 of each actuator is electrically connected to the blocking unit via an electrical connection carrying control signals to the blocking member 12.

These electrical connections are arranged in an electrical cable bundle 17 going down along the landing gear, the bundle having at least one brake harness 18 connecting the control and blocking units 13 and 14 to a connection unit 19 mounted on the actuator carrier, together with actuator cables 22, each actuator cable 22 connecting an actuator 5 to the connection unit 19. The brake harness 18 is connected to the connection unit via a connector 23 of the unit and a complementary connector of the harness. The actuator cables 22 are connected to each actuator via a connector 24 of the actuator and a complementary connector of the cable.

This is well known and is recalled only to provide the context of the invention.

Figure 3:
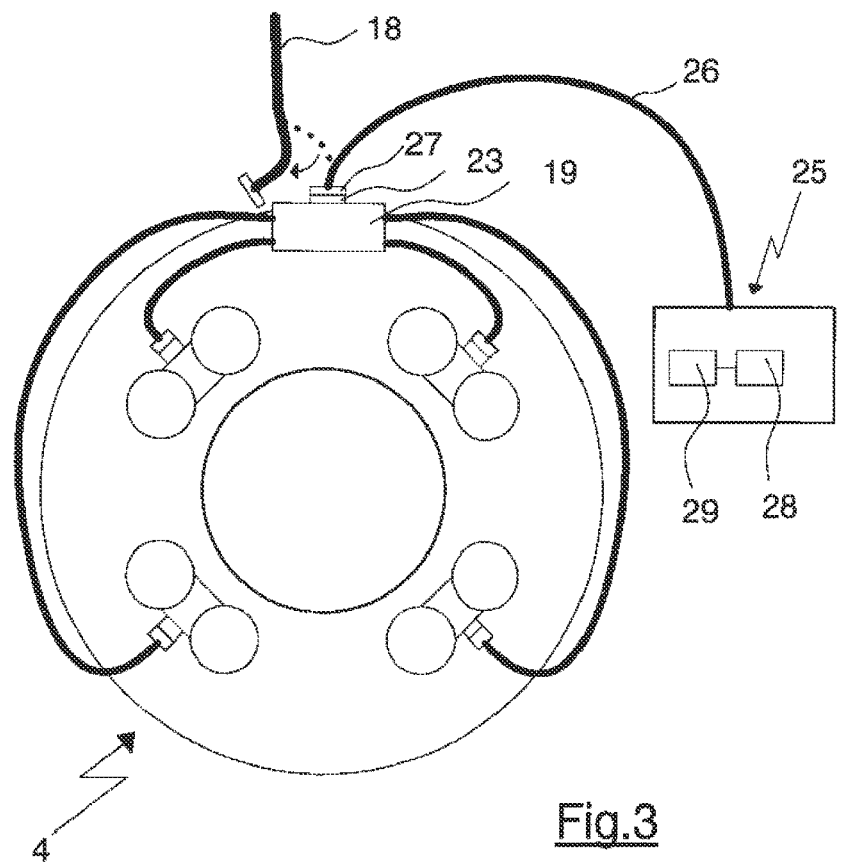

In order to unblock the brakes of an aircraft that is being held stationary on the ground by a parking brake, the invention proposes using an external control unit 25, shown in FIG. 3, that is brought to the proximity of each wheel by an operator on the ground. The control unit 25 is suitable for acting at least on the blocking members 12 of the actuators 5 in order to unblock their pushers 10. After the pushers 10 of the actuators of a brake have been unblocked, and because of the mechanical reversibility of the actuators and because of a certain amount of elasticity in the stack of disks 8 or the structure of the brakes, the pushers 10 move back relative to the stack of disks, thereby unblocking the brake. Once all of the brakes of the aircraft have been unblocked, the aircraft may be moved.

The external control unit 25 has a cable 26 with a connector 27, a battery 28, and an electronic control module 29. The electronic control module 29 is powered by the battery 28 and is suitable for selectively generating a control signal. The control signal, in this example providing low voltage power to a fail-safe brake, serves, on being applied to the blocking members 12 of the actuators 5, to unblock the pushers 10 of the brake actuators.

Advantageously, provision is made for the electrical control module 29 also to be adapted to acting on the electric motors of the actuators 5 in order to reverse the pushers 10 after the blocking members 12 have been unblocked. This makes it possible to eliminate the braking force directly and to ensure that no residual braking remains.

The method of the invention for unblocking a brake and that is performed by the operator on the ground begins with an initial step during which the operator disconnects the brake harness 18 from the connection unit 19.

Thereafter, the operator connects the external control unit 25 to the connection unit 19 by connecting the connector 27 of the external control unit 25 to the connector 23 of the connection unit 19. It should be observed that the connector 27 is complementary to the connector 23.

Thereafter, the operator causes the blocking members 12 of the actuators 5 to unblock the pushers 10 of the actuators, and possibly also causes the electric motors of the actuators 5 to cause the pushers 10 to reverse (if the electronic control module is capable of doing that).

Finally, the unblocking method of the invention includes a final step during which the operator disconnects the external control unit 25 and reconnects the brake harness 18 to the connector 23 of the connection unit 19.

Figure 4:
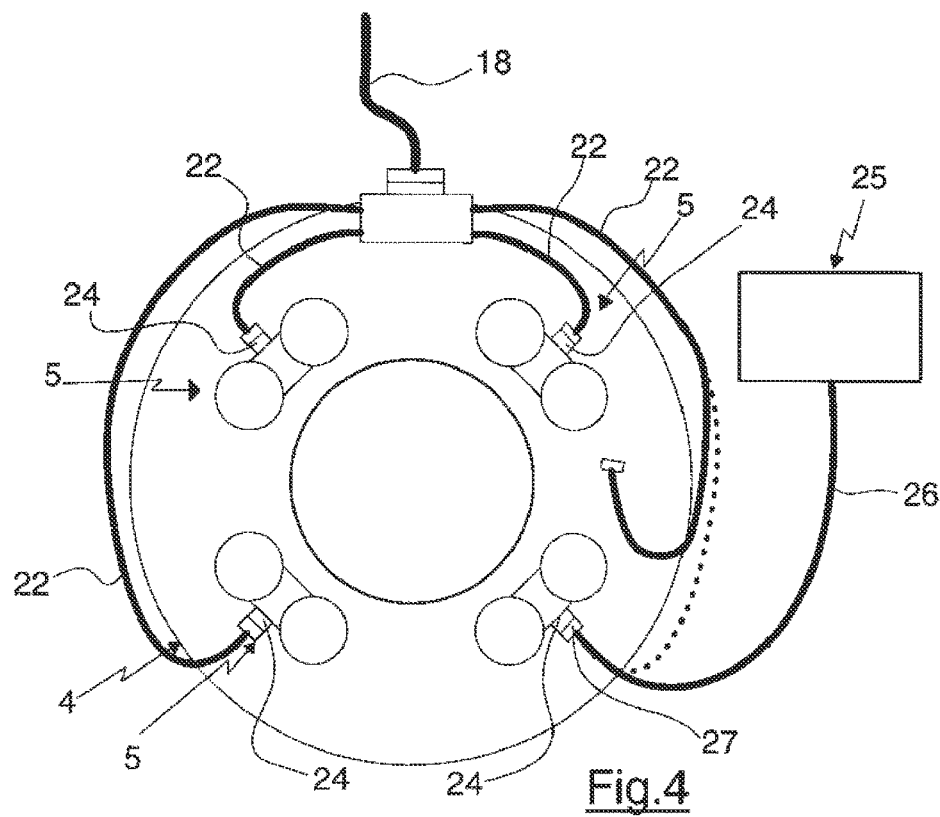

In a first variant of the unblocking method, described with reference to FIG. 4, the initial step consists in the operator disconnecting each actuator cable 22 from the corresponding actuator 5. Thereafter, the operator connects the connector 27 of the external control unit 25 to the connector 24 of one actuator 5 and causes the blocking member 12 of the actuator 5 to unblock the pusher 10, and possibly also causes the electric motor of the actuator 5 to reverse the pusher 10. These operations are repeated for each actuator, one after another. The final step then consists in reconnecting each actuator 5 to the corresponding actuator cable 22.

Figure 5:
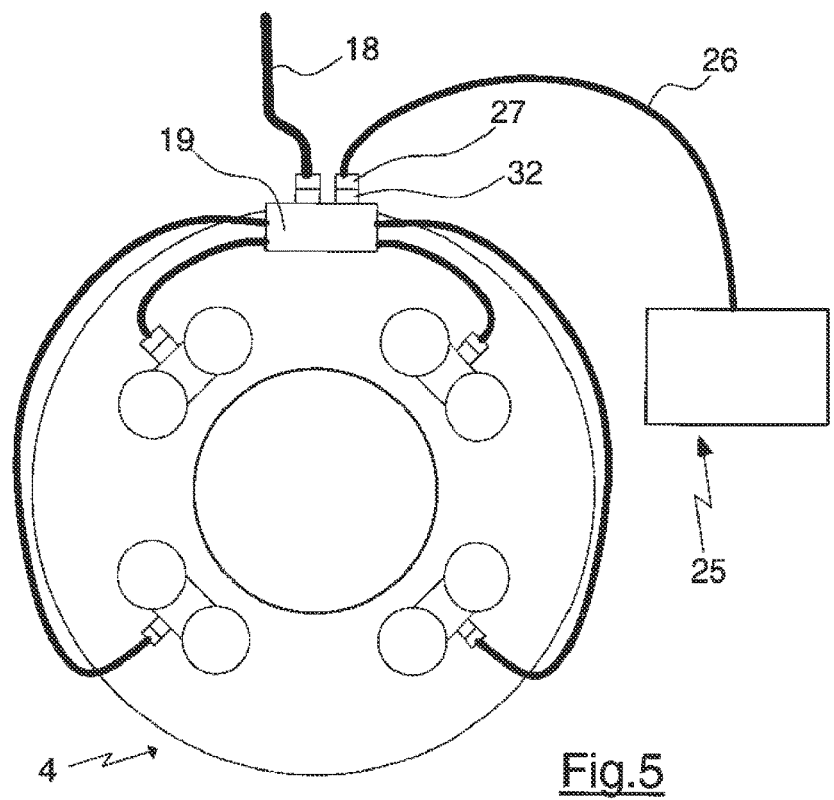

In a second variant of the unblocking method, described with reference to FIG. 5, there are no longer the initial step or the final step that consist in disconnecting and then reconnecting one or more cable harnesses that are connected in normal operation. On the contrary, provision is made to connect the external control unit 25 directly to the brake. For this purpose, the connection unit 19 is fitted with an additional connector 32 that is not used in normal operation of the brake. The connector 27 of the external control unit 25 is then complementary to the connector 32. Naturally, when it is not in use, the additional connector 32 must be protected from the outside environment (moisture, dust, etc.), e.g. by a protective cap that needs to be removed before connecting the external control unit.

Figure 6:
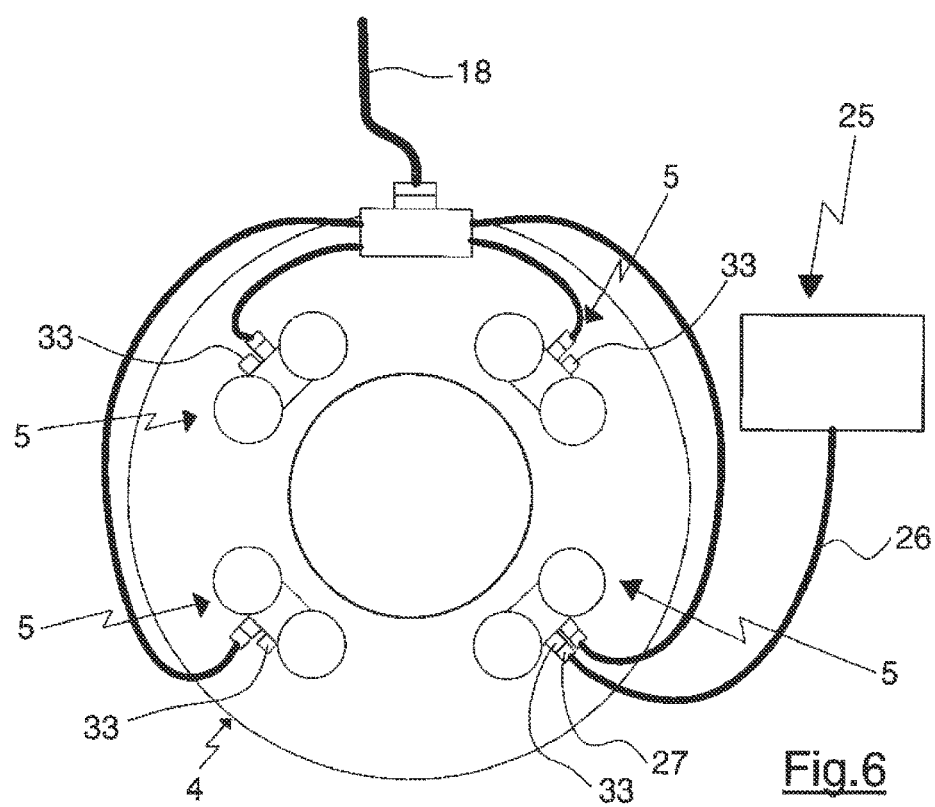

In a third variant of the unblocking method, described with reference to FIG. 6, provision is made for additional connectors 33 to be used that are fitted to each of the actuators 5. The connector 27 of the external control unit is then complementary to the additional connectors 33.

Finally, in a fourth variant of the unblocking method, described with reference to FIG. 7, provision is made for an electrical connection to be established between the connection unit 25 and the actuators 5 merely by contact: the additional connectors 33 of the actuators are replaced by electric terminals 34 implemented in this example in the form of flat pads. The external control unit has a connection element 35 that also has two electric terminals 36, these terminals being of the point contact type for co-operating electrically with the electric terminals 34 of the actuators 5 merely by making contact. The pusher is thus unblocked in a manner that is simple and fast. By using appropriate materials and methods for fabricating the electric terminals of the actuators, it is possible to leave them in the open air without adding any particular protection.

The invention is not limited to the particular embodiment and its variants as described above, but on the contrary covers any other variant coming within the ambit of the invention as defined by the claims.

Although the invention is illustrated by describing a brake in which the motors of all of the actuators are controlled by a common control unit and the blocking members are controlled by a common blocking unit, it is naturally possible to perform the invention using a different architecture. For example, it is possible for the functions performed by the control unit and by the blocking unit to be performed by a single unit.

Likewise, it is possible to provide for the electrical connections between the actuators and the unit(s) to be made by harnesses or cables that are arranged in some other way. It is thus possible to provide a plurality of connection units per brake, or indeed to provide for connecting a plurality of brakes to a common connection unit situated on the undercarriage, and itself connected to the control and blocking units. Provision may also be made for the brake to have no connection unit. Under such circumstances, the actuator cables are omitted and the brake harness is connected directly to the brake actuators, and it is the brake harness that is disconnected and then reconnected during the initial step and the final step.

The invention naturally applies to a brake having an arbitrary number of actuators (and in particular to a brake having a single actuator).

Although the blocking members are described as being constituted by fail-safe brakes, it is naturally possible to make use of other blocking members, providing they are capable of being actuated electrically.

The invention claimed is:

1. A method of unblocking an aircraft wheel brake performed by an operator on the ground, the brake having at least one electromechanical actuator (5) with at least one electric motor and a pusher (10) movable under drive from the motor facing friction elements (8) of the brake in order to apply a braking force selectively against the friction elements (8), the actuator (5) being provided with a blocking member (12) for blocking the pusher (10) in position, at least after the actuator has been operated to apply a parking brake force, the unblocking method being characterized in that it comprises the steps of:
   the operator on the ground bringing an external control unit (25) to the proximity of the wheel in such a way that the operator on the ground can connect the external control unit (25) to the brake,
   connecting the external control unit (25) to the brake, the external control unit being adapted to act at least on the blocking member (12) of the actuator; and
   using the external control unit (25) to cause the blocking member (12) to unblock the pusher (10), the blocking member (12) having power supplied exclusively by the external control unit (25).

2. An unblocking method according to claim 1, wherein the control unit (25) is also adapted to act on the motor of the actuator to move the pusher (10), the method including a step of using the external control unit (25) to cause the pusher (10) to reverse.

3. An unblocking method according to claim 1, including, in addition to the above-mentioned steps:
   an initial step consisting in disconnecting from the brake an electrical cable bundle (17) extending along the landing gear so as to enable the external control unit (25) to be connected to the brake instead of the electrical cable bundle (17); and
   a final step consisting in disconnecting the external control unit (25) and in reconnecting the electrical cable bundle (17) to the brake.

4. An unblocking method according to claim 1, wherein the external control unit (25) has a source of electrical energy (28) suitable for powering the brake while it is being controlled by the external control unit (25).

5. An unblocking method according to claim 1, wherein the external control unit (25) is connected directly to the brake.

6. An external control unit (25) separate from an aircraft and configured for being brought into the proximity of an aircraft wheel by an operator on the ground in order to control a brake of the wheel, the brake including at least one electromechanical actuator (5) with at least one electric motor and a pusher (10) movable under drive from motor facing friction elements (8) of the brake in order to apply a braking force selectively against the friction elements (8), the actuator being provided with a blocking member (12) for blocking the pusher (10) in position, at least after the actuator has been operated to apply a parking brake force, the unit (25) comprising:
   at least one electrical energy source (28),
   brake connection means (26, 27) for connection of the unit to the brake, and
   control means (29) powered by the energy source (28) and adapted to act at least on the blocking member (12) of the brake via the brake connection means in order to unblock the pusher (10),
   wherein the blocking member (12) has power supplied exclusively by the external control unit (25).

* * * * *